United States Patent [19]

Kagawa et al.

[11] Patent Number: 5,906,645

[45] Date of Patent: *May 25, 1999

[54] AUTO-DRIVE CONTROL UNIT FOR VEHICLES

[75] Inventors: Kazunori Kagawa, Odawara; Hiroaki Tanaka, Toyota, both of Japan

[73] Assignee: Toyota Jidosha Kabushiki Kaisha, Toyota, Japan

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/743,932

[22] Filed: Nov. 5, 1996

[30] Foreign Application Priority Data

Dec. 4, 1995 [JP] Japan ..................................... 7-315000
Dec. 11, 1995 [JP] Japan ..................................... 7-321587
Sep. 9, 1996 [JP] Japan ..................................... 8-237632

[51] Int. Cl.⁶ ............................................................. G06F 7/70
[52] U.S. Cl. .............................. 701/23; 701/88; 180/167; 340/903
[58] Field of Search ................................ 701/70, 71, 75, 701/80, 84, 41, 93, 24, 23, 88, 89; 180/197, 247, 167, 168; 340/903, 905, 436

[56] References Cited

U.S. PATENT DOCUMENTS

| | | | |
|---|---|---|---|
| 4,373,161 | 2/1983 | Matsumura | 180/167 |
| 4,530,056 | 7/1985 | MacKinnon et al. | 364/449 |
| 4,582,159 | 4/1986 | Suzuki | 180/247 |
| 4,691,284 | 9/1987 | Izumi et al. | 701/38 |
| 4,695,068 | 9/1987 | Kawamoto et al. | 180/409 |
| 4,847,773 | 7/1989 | Van Helsdingen et al. | 701/200 |
| 4,932,617 | 6/1990 | Heddebaut et al. | 340/933 |
| 4,949,261 | 8/1990 | Ito et al. | 701/41 |
| 5,093,790 | 3/1992 | Shiraishi et al. | 701/81 |
| 5,275,253 | 1/1994 | Sperduti et al. | 701/69 |
| 5,289,895 | 3/1994 | Takata et al. | 701/69 |
| 5,318,143 | 6/1994 | Parker et al. | 180/168 |
| 5,369,591 | 11/1994 | Broxmeyer | 340/903 |
| 5,373,911 | 12/1994 | Yasui | 364/424.027 |
| 5,448,479 | 9/1995 | Kemner et al. | 701/23 |
| 5,481,268 | 1/1996 | Higgins | 342/70 |
| 5,485,378 | 1/1996 | Franke et al. | 701/41 |
| 5,698,259 | 12/1997 | Collimucci | 180/168 |
| 5,708,427 | 1/1998 | Bush | 340/941 |
| 5,774,069 | 6/1998 | Tanaka et al. | 701/24 |

FOREIGN PATENT DOCUMENTS

| | | |
|---|---|---|
| 2 736 225 | 1/1997 | France . |
| 1-106910 | 7/1989 | Japan . |
| 03-282713 | 12/1991 | Japan . |
| 03-286315 | 12/1991 | Japan . |
| 06-336167 | 12/1994 | Japan . |
| 2 270 438 | 3/1994 | United Kingdom . |
| WO 96/00910 | 1/1996 | WIPO . |

*Primary Examiner*—Jacques H. Louis-Jacques
*Attorney, Agent, or Firm*—Finnegan, Henderson, Farabow, Garrett & Dunner, L.L.P.

[57] ABSTRACT

A unit for smoothly switching from auto-drive to manual drive for a vehicle provided with an auto-drive mode. To perform auto-drive, an auto-drive ECU controls steering wheel, brake, and accelerator actuators in accordance with signals from a route recognition/obstruction check sensor, a GPS and the like. When an interface (switch) for switching to the manual drive is operated, the auto-drive ECU evaluates running stability/instability in accordance with signals from various running safety devices and sensors for detecting a variation in vehicle state, and if the vehicle is in an instable state, prohibits a shift to the manual drive, even when the vehicle is running on a straight road.

9 Claims, 5 Drawing Sheets

AUTO-DRIVE CONTROL UNIT FOR VEHICLES

BACKGROUND OF THE INVENTION a) Field of the Invention

The invention relates to an auto-drive control unit for vehicles, and more particularly to unit for controlling mode changeover from auto-drive to manual drive.

b) Description of the Related Art

A conventional automatic driving system is known that controls vehicle speed and steering angle based on information from various sensors and switches between an auto-drive mode and a manual drive mode by a changeover switch when necessary. There is, however, a significant problem in determining when the changeover shall be made as a driver is required to operate the steering wheel with high driving skill immediately after changing mode changes if the auto-drive mode is switched to the manual drive mode when the vehicle's running is not stable. For example, Japanese Patent Laid-Open Publication No. Hei 3-282713 discloses a technology where switching from the auto-drive mode to the manual drive mode is prohibited when the vehicle is running on a curved road.

However, conditions where a vehicle's running is not stable are not limited to curved roads, but also include a straight roads. For example, running becomes unstable due to significant disturbances when a vehicle running on a straight road is exposed to a side wind, a vehicle is running on uneven road surfaces, or a vehicle is running across rain puddles. If auto-drive is switched to manual drive under such conditions, the driver may be required to unexpectedly operate the steering wheel.

SUMMARY OF THE INVENTION

The invention has been completed in view of the disadvantages of the related art, and aims to provide an auto-drive control unit which prohibits shifting from auto-drive to manual drive when a running vehicle is unstable, even on straight roads, and allows shifting from the auto-drive to the manual drive only when the vehicle is in a stable state, thereby providing smooth running.

To achieve the above object, the auto-drive control unit of the invention comprises running control means for performing auto-drive to control speed and steering angle of the vehicle based on detection signals from a plurality of sensors, changeover means for switching between the auto-drive and manual drive, evaluation means for evaluating running stability of the vehicle when the steering angle is within a given range and substantially in a neutral state, and mode control means for prohibiting the changeover from the auto-drive to the manual drive by the changeover means when the vehicle running is evaluated to be in an unstable state by the evaluation means. The condition that the steering angle is substantially in a neutral state means that the vehicle is running on a straight road, and the evaluation means evaluates the running stability of the vehicle on a straight road. The unstable state means a condition that desired running cannot be retained due to external disturbance unless some corrective operation is performed.

Examples of evaluating the stable state of a vehicle include a method which refers to acceleration of a vehicle, a method which refers to a vehicle's yaw rate, a method which refers to the operation or nonoperation of an antilock brake system mounted on a vehicle, a method which refers to the operation or nonoperation of a traction control system mounted on a vehicle, a method which refers to the operation or nonoperation of a vehicle stability control system mounted on a vehicle, and a method which refers to the operation or nonoperation of an auto-brake system mounted on a vehicle. It is also generally evaluated that a vehicle is in an unstable state when a running safety device mounted on the vehicle is operating. Even when a running stability control device mounted on the vehicle is not operating, the vehicle is evaluated to be in an unstable state when a variation in vehicle state is equal to or above a prescribed value.

DETAILED DESCRIPTION OF THE PREFERRED EMBODIMENTS

Embodiments of the invention will be described with reference to the accompanying drawings.

First Embodiment

Figure 1:
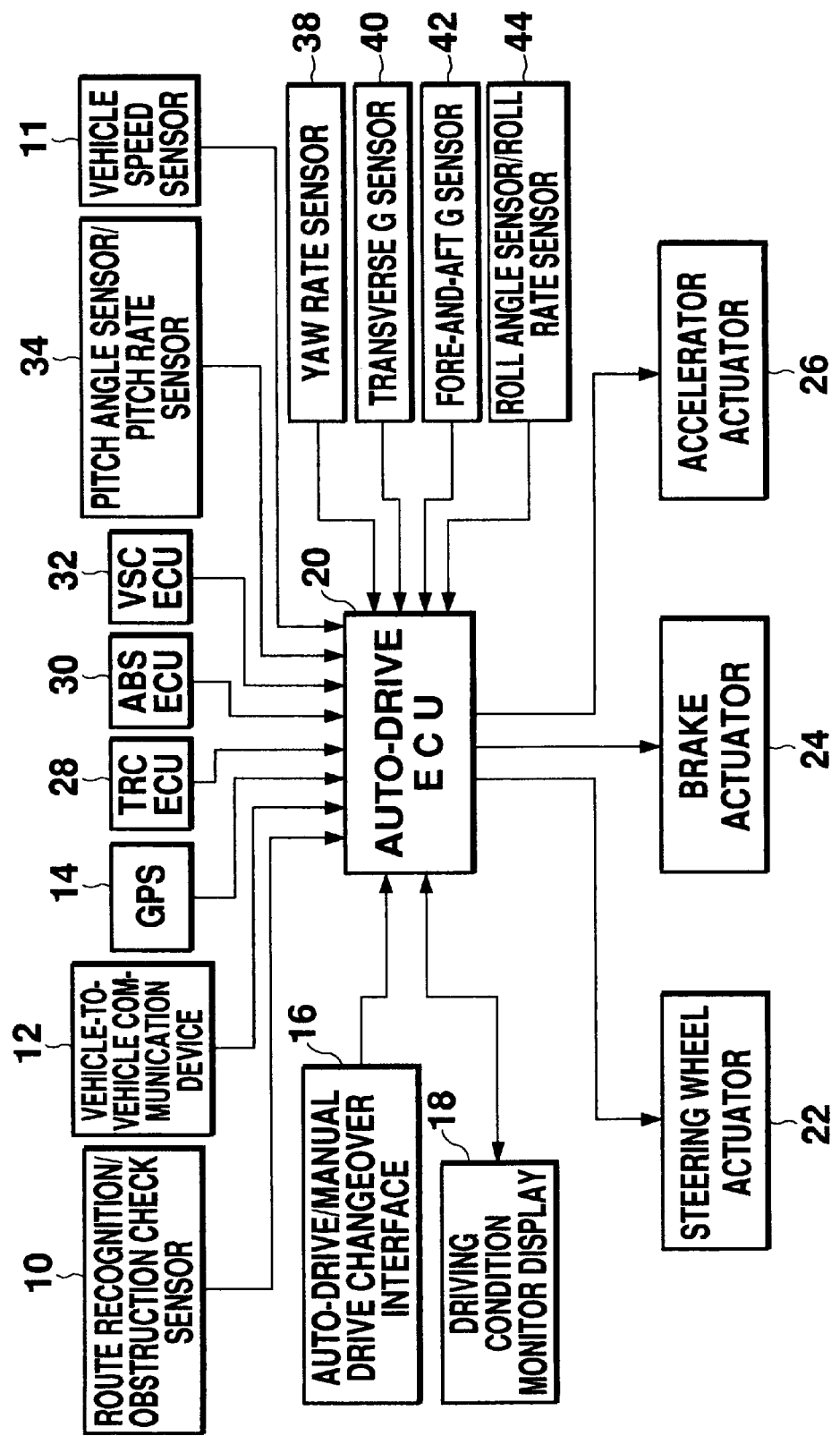
FIG. 1 is a structural block diagram of the device in a first embodiment.

FIG. 1 is a structural block diagram of this embodiment. A route recognition/obstruction check sensor 10 such as a CCD camera, a vehicle speed sensor 11, a vehicle-to-vehicle communication device 12 such as an infrared ray transmitter-receiver, and a GPS 14 are provided for an auto-drive system, and respective detection signals are supplied to an auto-drive ECU (electronic control unit) 20. The auto-drive ECU 20 drives a steering wheel actuator 22, a brake actuator 24, and an accelerator actuator 26 based on such detection signals to effect auto-driving. A changeover interface (manual changeover switch) 16 for switching between the auto-drive and the manual drive is provided near the driver's seat. By operating this changeover switch, changeover between the auto-drive and the manual drive can be made. Changeover from the auto-drive to the manual drive can only be made under specific conditions and will be described afterward. A driving condition monitor display 18 is a device for assisting smooth operation by displaying a distinction between the auto-drive and the manual drive, a distinction whether the auto-drive can be switched to the manual drive (shifting), or an operation guide (during the auto-drive, guiding a method for shifting to the manual drive) in accordance with circumstances. The display can be configured by disposing an LED display on the instrument panel.

As means for detecting various state quantities required for evaluation of the vehicle's running stability, a pitch angle/pitch rate sensor 34, a yaw rate sensor 38, a transverse G sensor 40, a fore-and-aft G sensor 42, and a roll angle/roll rate sensor 44 are provided, and respective detection signals are supplied to the auto-drive ECU 20. ECUs 28, 30, 32 for controlling various running safety devices equipped on some vehicles can be used as state detection sensors.

In this embodiment, the following devices are exemplified as running stability control devices.

<Traction control system>

This is a system to secure directional stability and driving force of a vehicle, which starts and accelerates on a snow road, by preventing a wheel spin from occurring due to an excess driving force, and will hereinafter be referred to as a TRC.

<Antilock brake system>

This is a system to prevent wheels from being locked when severe brake action is taken on slippery surfaces, and will hereinafter be referred to as an ABS.

<Vehicle stability control system>

This is a system to prevent a vehicle from spinning by varying the torque distribution of wheels, and will hereinafter be referred to as a VSC.

In this embodiment, a vehicle under the following conditions is evaluated to be in an unstable state.

(A) When transverse gravity of a prescribed value or above is produced.
(B) When fore-and-aft gravity of a prescribed value or above is produced.
(C) When a yaw rate of a prescribed value or above is produced.
(D) When a roll angle and roll rate of a prescribed value or above are produced.
(E) When a pitch angle and pitch rate of a prescribed value or above are produced.
(F) When the TRC is operating.
(G) When the ABS is operating.
(H) When the VSC is operating.

The prescribed value of the transverse gravity may be determined to be, for example, 0.02 G or above in view of a vehicle speed and a turning radius. The prescribed value of the fore-and-aft gravity may be determined to be, for example, 0.4 G or above. The prescribed values of other physical quantities can be determined to be optimum by conducting various experiments.

In view of any one or a combination of the above items, the auto-drive ECU 20 as evaluation means and mode control means determines whether the vehicle is running in a stable state or an unstable state, and if the vehicle is determined to be in an unstable state, prohibits a changeover from the auto-drive to the manual drive, even when the vehicle is running on a straight road. Thus, the load on the driver of operating the steering wheel involved in the manual drive in an unstable state is reduced and smooth driving can be retained.

A changeover prohibiting process of the auto-drive ECU 20 using the above conditions in combination will next be described in detail.

Figure 2:
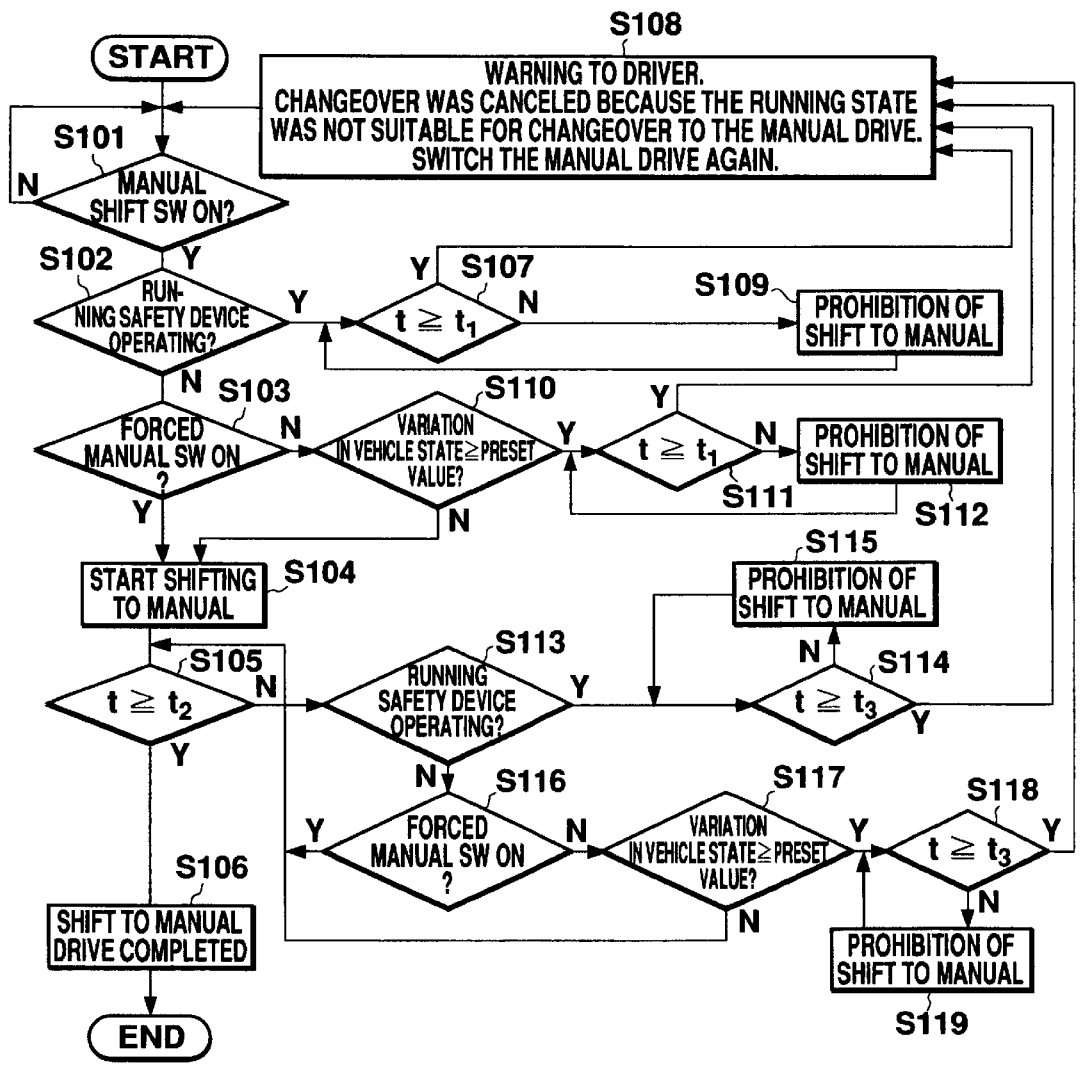
FIG. 2 is a processing flowchart of the device shown in FIG. 1.

FIG. 2 shows a flowchart of the changeover process. The auto-drive ECU 20 judges whether the manual changeover switch (manual shift switch) 16 has been operated (S101). When the changeover switch is operated by the driver during the auto-drive, the auto-drive ECU 20 judges whether a running safety device is operating on the basis of operation signals from respective ECUs (S102). When any one or more of the running safety devices 28, 30, 32 are operating, the auto-drive ECU 20 judges whether a prescribed time t1 has elapsed after the start of operation (S107). If the prescribed time has not elapsed, the auto-drive ECU 20 prohibits a shift to the manual drive mode, regardless of the operation of the changeover switch (S109). This shift prohibition is performed even when the vehicle is running on a straight road. If the prescribed time has elapsed, a message "Changeover was canceled because the running state was not suitable for changeover to the manual drive. Switch to manual drive again." is shown on the display (S108), and the process from S101 is repeated.

Figure 3:
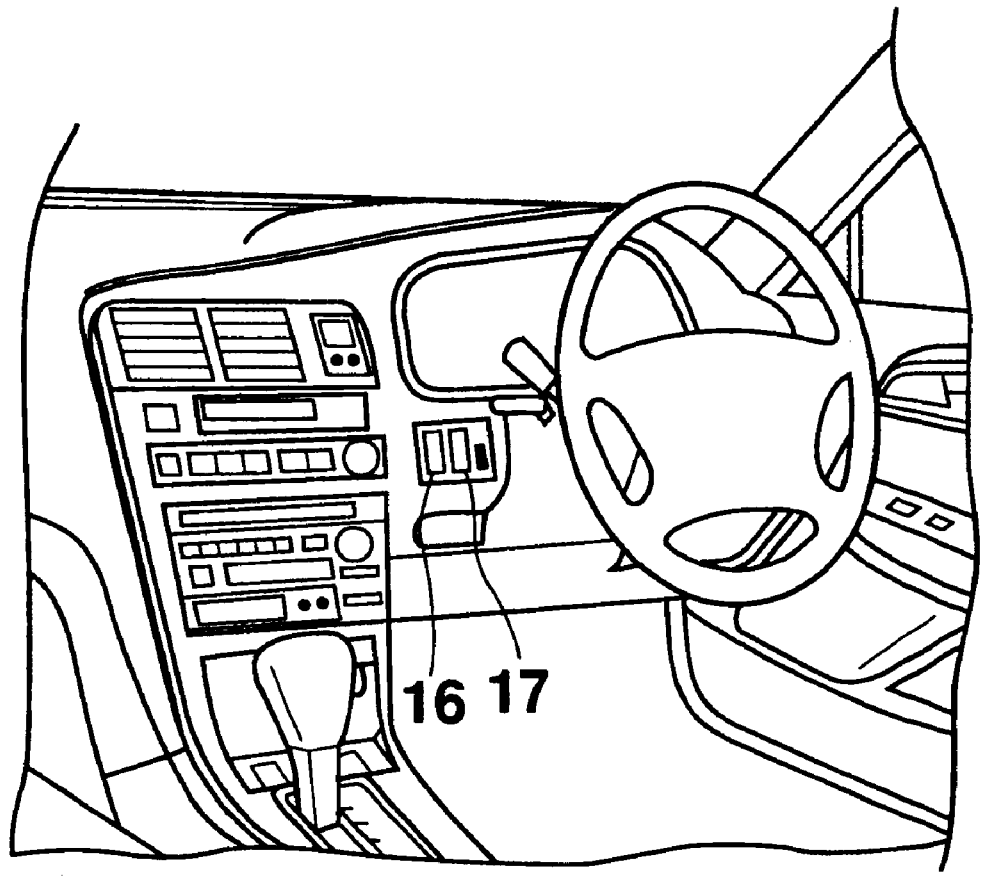
FIG. 3 is an arrangement explanatory view of the changeover interface (changeover switch) shown in FIG. 1.

When the driver once again operates the manual changeover switch in a state described above, the shift to manual drive is prohibited if any one or more of the running safety devices are operating. But, when operation of the running safety device is completed, the auto-drive ECU 20 judges whether a forced manual switch has been turned on (S103). The forced manual switch is a switch for a driver to forcedly, intentionally intervene in the operation, and is operated by the driver to shift to manual drive after being informed that turning states or irregular surfaces are continuing for a long time. The forced manual switch 17 can be provided near the changeover switch 16 as shown in FIG. 3. If the forced manual switch 17 is not on, it is judged whether a variation in vehicle state is equal to or above a prescribed value (S110). This judgment is made on any one of the conditions (A) to (E) above or a plurality of AND conditions, and even if a running stability control device is not operating, shifting to manual drive is prohibited because such a shift increases the load on the driver when these conditions are satisfied (eS111, S112). On the other hand, when a variation in vehicle state is not equal to or above a prescribed value, the vehicle is considered to be running in a stable state, and shifting to the manual drive is allowed (S104). And, when both the manual changeover switch 16 and the forced manual switch 17 are on, the shift to the manual drive is started regardless of the magnitude of a variation in vehicle state because this shift is made by the intention of the driver (S104). Thus, the following modes are achieved.

(1) Running safety device is operating
   Indiscriminate prohibition of shift to the manual drive.
(2) Running safety device is not operating and a variation in vehicle state is equal to or above a prescribed value
   Prohibition of the shift to the manual drive with the manual changeover switch on.
   Allowance of the shift to the manual drive with the manual changeover switch and the forced changeover switch on.
(3) Running safety device is not operating and a variation in vehicle state is equal to or below a prescribed value
   Allowance of the shift to the manual drive with the manual changeover switch on.

Since a certain time is required before the shift to the manual drive is completed, the running state may change from a stable state to an unstable state during that time. Therefore, it is judged whether a prescribed time t2 has elapsed (S105) and, if not and the running safety device has operated, the shift to the manual drive is canceled, even when the forced manual switch 17 is on (S114, S115, S108). If the running safety device is not operating, it is judged whether the forced manual switch 17 is on (S116). If the forced manual switch 17 is not operated and only the manual changeover switch 16 is on, it is judged whether the vehicle state is changed to the unstable state (S117), and if so, the shift to the manual drive is canceled (S119). On the other hand, if the vehicle state did not change in the prescribed time t2, the shift to the manual drive is completed because the changeover to the manual drive can be made smoothly (S106). When the forced manual switch 17 is on, the shift to the manual drive is completed regardless of the vehicle state because it is intended by the driver as described above (S106).

Thus, when the running safety device is operating, shifting to the manual drive is indiscriminately prohibited, and even when the running safety device is not operating, the shift to the manual drive is prohibited when it is judged that a variation in vehicle state is equal to or above the prescribed value and the vehicle is in an unstable state though the manual drive changeover switch is on, so that the driver is less required to steer the steering wheel with high driving skill immediately after switching, and the shift to the manual drive can be made smoothly. And, at the time when the manual drive changeover switch is operated, even when the vehicle is running in a stable state, a change in running state before the completion of the shift is monitored, and if the running state changes to the unstable state, the shift to the manual drive is canceled, so that it is possible to fully cope with the change in running circumstances. Besides, in view of the relation in magnitude between the threshold value of the running stability control device and the prescribed value of a variation in vehicle state such as transverse gravity, the intervention by the driver who operates the forced manual switch is allowed when the variation in vehicle state only is equal to or above the prescribed value, so that the manual drive in an unstable state to some extent desired by a skilled driver can be coped with.

In this embodiment, the running unstable state is evaluated in two steps, one that a physical quantity such as transverse G is equal to or above the prescribed value and the other that the running safety device is operating, but the running stability and instability may be evaluated according to the operation of a running safety device, and the running stability and instability may be evaluated according to whether a physical quantity such as transverse G is equal to or above a prescribed value.

Second Embodiment

Figure 4:
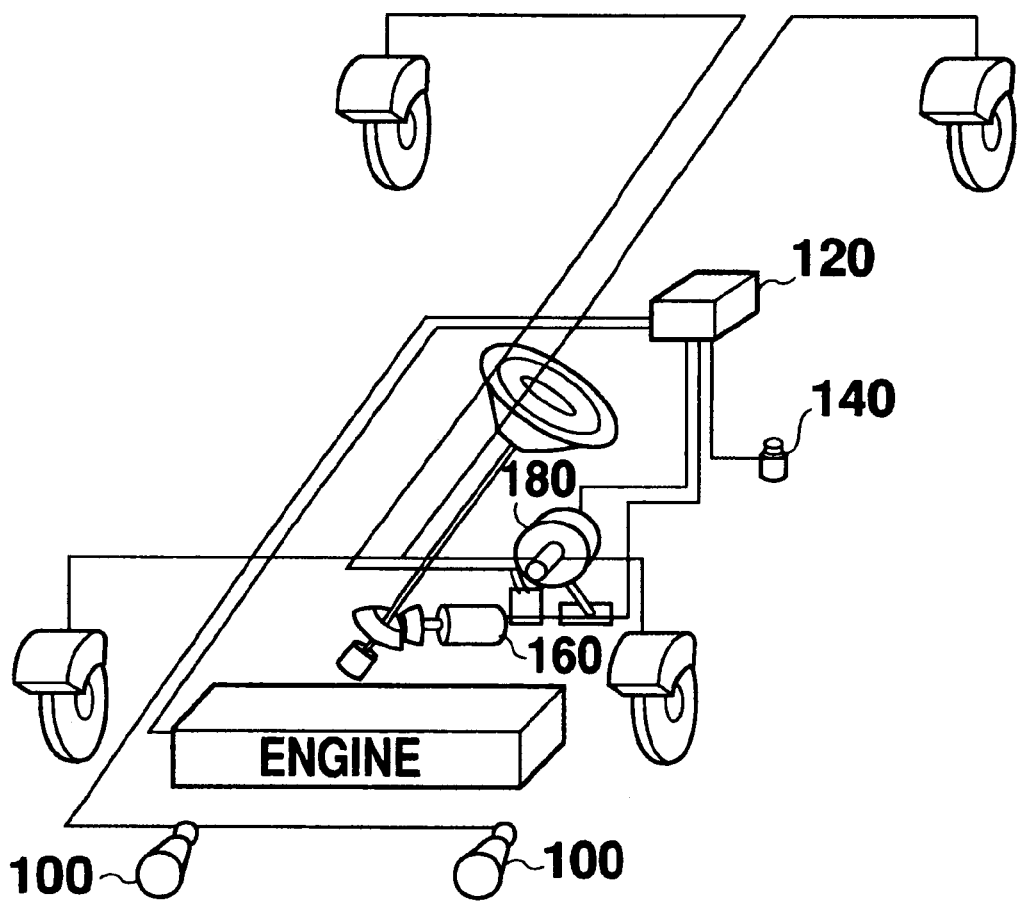
FIG. 4 is a structural view of the device in a second embodiment.

FIG. 4 shows the system configuration according to this embodiment. Route/obstruction check sensors 100 such as a CCD camera are provided at the front of a vehicle to supply detection signals to an auto-drive ECU (electronic control unit) 120. Based on the received detection signals (or based on signals from another sensor such as a vehicle speed sensor), the auto-drive ECU 120 controls a steering wheel actuator 160, and when a distance between an obstruction such as a forward vehicle and an own car is decreased to a prescribed distance or below, activates a brake actuator 180 to automatically brake. An auto-manual changeover switch 140 is a switch to instruct a mode change between the auto-drive and the manual drive to the auto-drive ECU 120 and provided near the driver's seat.

In this embodiment, when the changeover switch 140 is operated during the auto-drive, the auto-drive ECU 120 change the shift to the manual drive mode. But during automatic braking, shifting to the manual drive is prohibited and automatic braking is continued. Thus, running safety is secured and the shift to the manual drive can be made smoothly.

The shifting process to the manual drive mode will be described with reference to the flowchart of FIG. 5.

Figure 5:
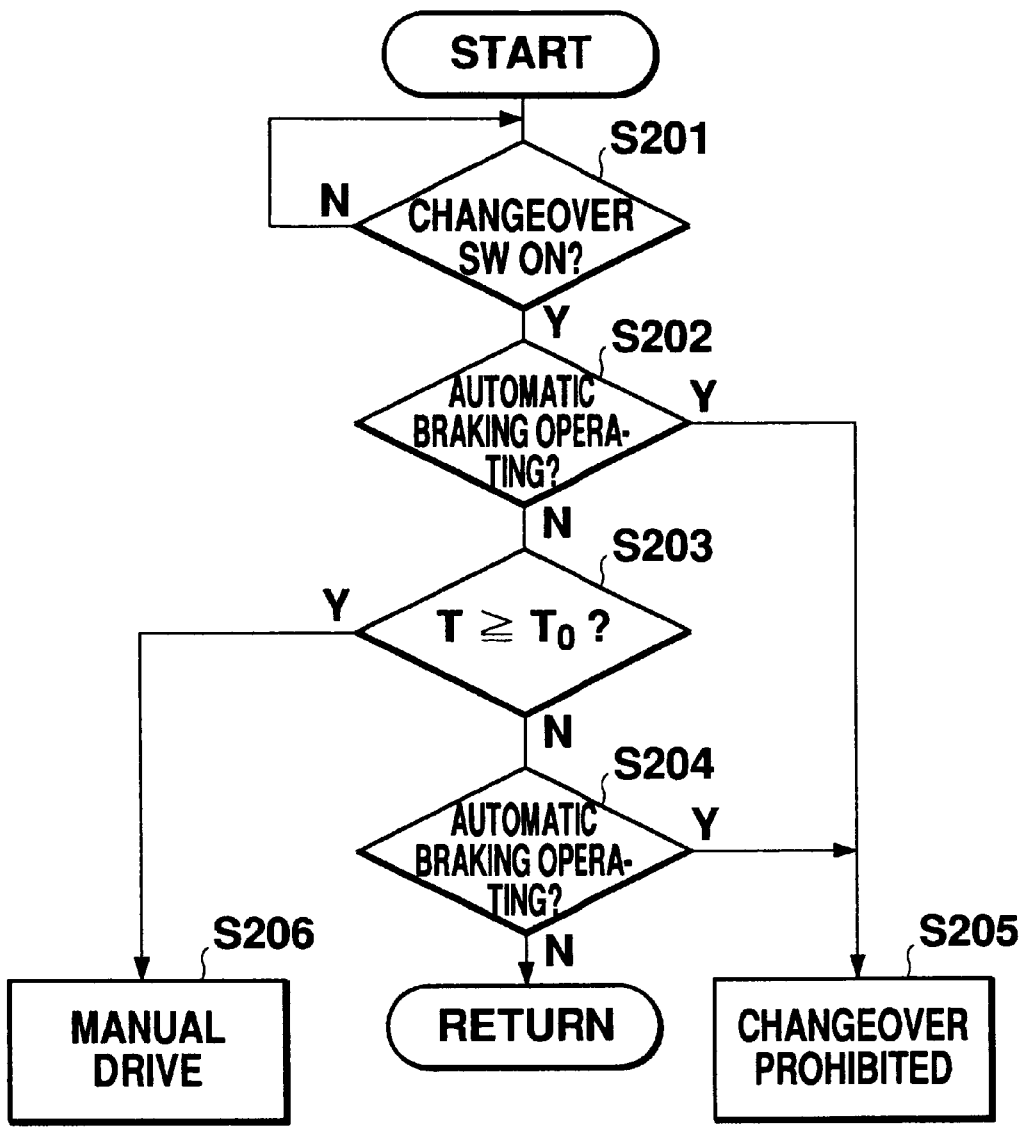
FIG. 5 is a processing flowchart of the device shown in FIG. 4.

In FIG. 5, the auto-drive ECU 120 judges whether the changeover switch 140 has been turned on (S201). When the changeover switch 140 is turned on during auto-drive, the auto-drive ECU 120 judges whether automatic braking is operating (S202). When automatic braking is operating, the auto-drive ECU 120 disregards the operation of the switch and prohibits the changeover to the manual drive (S205). At this time, a message "Changeover to the manual drive is prohibited because automatic braking is underway." may be shown on the display which is provided near the driver's seat. If automatic braking is not in progress, the auto-drive ECU 120 judges whether a prescribed time T0 has elapsed after the operation of the changeover switch (S203). This judgment considers a certain time required to complete the shift from the auto-drive to the manual drive. And, if this time does not exceed this time lag T0, the auto-drive ECU 120 judges again whether the automatic braking is underway (S204). If automatic braking is in progress, the auto-drive ECU 120 indiscriminately prohibits changeover to the manual drive mode, and continues the automatic braking (S205). On the other hand, when a prescribed time T0 has elapsed without operation of automatic braking, the auto-drive ECU 120 completes the changeover to the manual drive mode (S206).

As described above, in this embodiment, during automatic braking and when the automatic braking is performed during the time lag before the completion of the shift to the manual drive, changeover to the manual drive mode by the changeover switch is prohibited and the automatic braking is retained so that the driver is not forced to make unnecessary braking operations and therefore the shift to manual drive can be made smoothly.

While there have been described that what are at present considered to be preferred embodiments of the invention, it is to be understood that various modifications may be made thereto, and it is intended that the appended claims cover all such modifications as fall within the true spirit and scope of the invention.

What is claimed is:

1. An auto-drive control unit for a vehicle comprising:
   (a) running control means for performing auto-drive to control speed and steering angle of the vehicle based on detection signals from a plurality of sensors,
   (b) changeover means for switching between the auto-drive and manual drive,
   (c) evaluation means for evaluating running stability of the vehicle while running when the steering angle is within a given range and substantially in a neutral state, and
   (d) mode control means for prohibiting changeover from the auto-drive to the manual drive by said changeover means when the vehicle running is evaluated to be in an unstable state by said evaluation means.

2. The auto-drive control unit according to claim 1, wherein said evaluation means evaluate the running stability with reference to acceleration of the vehicle.

3. The auto-drive control unit according to claim 1, wherein said evaluation means evaluate the running stability with reference to a yaw rate of said vehicle.

4. The auto-drive control unit according to claim 1, wherein said evaluation means evaluate the running stability with reference to the operation or nonoperation of an antilock brake system mounted on the vehicle.

5. The auto-drive control unit according to claim 1, wherein said evaluation means evaluate the running stability with reference to the operation or nonoperation of a traction control system mounted on the vehicle.

6. The auto-drive control unit according to claim 1, wherein said evaluation means evaluate the running stability with reference to the operation or nonoperation of a vehicle stability control system mounted on the vehicle.

7. The auto-drive control unit according to claim 1, wherein said evaluation means evaluate the running stability with reference to the operation or nonoperation of an auto-brake system mounted on the vehicle.

8. The auto-drive control unit according to claim 1, wherein said evaluation means evaluate that the vehicle is in an unstable state when a running safety device mounted on the vehicle is operating.

9. The auto-drive control unit according to claim 1, wherein said evaluation means evaluate that the vehicle is in an unstable state when a running stability control device mounted on the vehicle is not operating and a variation in vehicle state is equal to or above a given value.

* * * * *